United States Patent
Schultz

[15] 3,670,756
[45] June 20, 1972

[54] COMPRESSOR GOVERNOR
[72] Inventor: Forrest O. E. Schultz, Owosso, Mich.
[73] Assignee: Midland-Ross Corporation, Toledo, Ohio
[22] Filed: May 8, 1970
[21] Appl. No.: 35,620

[52] U.S. Cl. ............................................................137/102
[51] Int. Cl. ......................................................G05d 7/00
[58] Field of Search ..................137/102, 115, 116.3, 116.5, 137/117

[56] References Cited

UNITED STATES PATENTS 3,002,520  10/1961  Morse.....................................137/102
3,428,070  2/1969  Valentine.................................137/102
3,545,887  12/1970  Kobnick..............................137/115 X Primary Examiner—Robert G. Nilson
Assistant Examiner—David J. Zobkiw
Attorney—Peter Vrahotes and Harold F. Mensing

[57] ABSTRACT

A compressor governor having a variable orifice means associated with a valve means which causes positive and instantaneous response from the pumping mode to the unloaded mode and from the unloaded mode to the pumping mode. Means is also provided to limit the adjustment in both directions to avert injury of the governor components and malfunction of the device that might otherwise result.

13 Claims, 4 Drawing Figures

INVENTOR.
FORREST O. E. SCHULTZ
BY
ATTORNEY

COMPRESSOR GOVERNOR

In pneumatic systems of the type commonly used on commercial vehicles and combinations of vehicles for the operation of air brakes and the like, the fluid under pressure is stored in one or more reservoirs. The pressure is generated by an air compressor normally driven by the vehicle engine. Since the demand for fluid under pressure is not continuous, whereas the compressor means runs more or less continuously, it becomes necessary to provide means for limiting the pressure in the storage means at both high and low values. This is the basic purpose of an air compressor governor. Many governor devices are available to perform this function and, for the most part, each embodies two fluid connections. One connection is to the reservoir by which the governor continuously senses the pressure level of the system. The other is to a means commonly called an unloader, by which means an air compressor is made to pump or not pump air as the governor dictates. The two fundamental operating positions of a compressor governor are the pumping mode and the unloaded mode. Severe damage can be inflicted upon a compressor and on the governor itself if the transition from one mode to the other in either direction is not positive and instantaneous. The difference between the two pressures to which the governor responds in normal operation is called its range and a common fault is a tendency toward a narrow range, a condition that frequently becomes more acute with the passage of time. The malfunction that accompanies narrow range often takes the form of an oscillation which not only damages the equipment, but results in a loss of air pressure in the system.

It is, therefore, an object of this invention to provide a compressor governor with positive and instantaneous response in a plurality of directions.

It is another object of this invention to provide a compressor governor in which the means for attaining instant response automatically adapts to the direction of the impending action prior to its occurrence.

It is a further object of this invention to provide a compressor governor which cannot be inadvertently adjusted above or below its performance capabilities.

It is still another object of this invention to provide a compressor governor with a non-adjustable range to reduce the tendency toward oscillation throughout the spectrum of pressure adjustment.

Other objects and advantages of the invention will appear more fully hereinafter from the following description, when considered in connection with the accompanying drawing in which.

Figure 1:
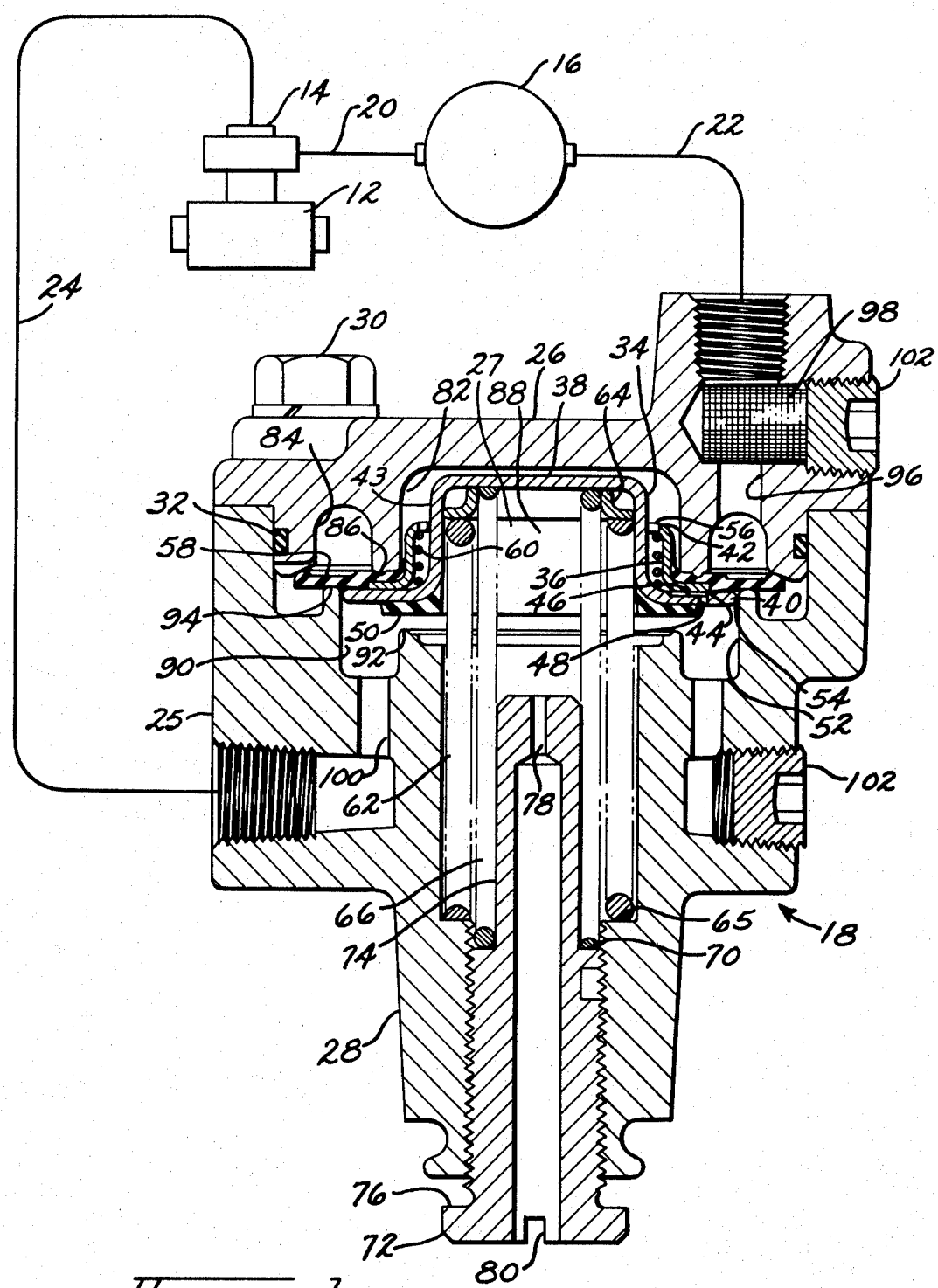
FIG. 1 is a cross section of a governor embodying the principles of the instant invention shown in the pumping mode with a compressor and a reservoir, diagrammatically represented, attached thereto.

Referring now to the drawing, a portion of a pneumatic system is shown at FIG. 1, consisting of a compressor 12, an unloader 14 in operable communication with the compressor, a reservoir 16, and a governor 18. The discharge from the compressor 12 is in communication with the reservoir 16 through a fluid line 20. The reservoir 16 is in communication with the governor 18 through a second fluid line 22, and the governor is in communication with the unloader 14 through a third fluid line 24.

The governor 18 consists of a housing 25 having two portions, an inlet housing portion 26, and an outlet housing portion 28 fastened together by any suitable means such as screws 30 which two portions define a central cavity 27. The juncture between the housing portions 26 and 28 is rendered airtight by a sealing ring 32.

Disposed within the housing 25 are movable first and second elements 34 and 36, respectively. The first element 34 is generally tubular, having a disk-like closure 38 at one end and a washer-like projection 40 extending outwardly at the other end. The second element 36 is generally tubular, having a washer-like projection 42 defining an opening 43 therein, extending inwardly at one end and another washer-like projection 44 extending outwardly at the other end. One or more channels 46 are radially disposed in the face of the projection 40 adjacent the abutting face of the projection 44. At the outer end of each channel is an orifice 48 which completes a restricted passageway through the projection 40. On the opposite face of projection 40 a rubber-like valve member 50 is securely vulcanized. The outer diameter of projection 40 is slidably guided in a bore 52 of the outlet housing portion 28. The fit between the projection 40 and the bore 52 is such that the annular space 54 therebetween constitutes an area several times that of the combined areas of the orifices 48. The inner edge of projection 42 is slidably guided on the cylindrical portion of element 34 and has one or more slots 56 for the free passage of air therebetween.

An outwardly extending, resilient diaphragm 58 is secured to the projection 44. As an example, the diaphragm may be made from a selected rubber material and vulcanized to the projection 44. A spring 60 is interposed between projection 40 and projection 42, lightly urging them apart. A non-adjustable spring 62 is disposed between a support 64 and a face 65 in the outlet housing 28. An adjustable spring 66 is disposed between the disk-like closure 38 of element 34 and a shoulder 70 on an adjusting screw 72. The support 64 for the spring 62 abuts the closure 38 which absorbs the thrust and serves the further purpose of centering the proximate end of the spring 66. The adjusting screw 72 is threadably received in the outlet housing 28 and has: a stem 74 for radial support of spring 66; a shoulder 76 that provides a limit stop for the compression that can be applied to spring 66; an orifice 78 confluent with an opening 79 for communication of the interior of the governor 18 to atmosphere therethrough; and a slot 80 for adjustment as with a screwdriver. Compressor governors are frequently adjusted in service, and it is desirable to provide adjusting means that will not become the instrument of governor malfunction. This will happen on occasion when adjustment is made, even momentarily, to a value above or below the pressure limits within which the device is capable of operating. By virtue of the fixed spring 62 and the limit stop 76 on the adjusting spring 62, the compressor governor 18 of this invention is rendered immune to failures attributable to maladjustment that might otherwise be experienced in service.

The inlet housing 26 defines a cavity 82 and an annular cavity 84 communicating with each other by means of a valve seat 86 cooperating with a face of the diaphragm 58 which serves in this respect as a valve member. The outlet housing 28 defines a central cavity 88, in continuous communication with the atmosphere through the orifice 78, and another annular cavity 90. The cavities 88 and 90 communicate with each other by means of a valve seat 92 cooperating with the valve member 50. The cavities 82 and 90 communicate with each other at all times by means of channels 46 and orifices 48 and, in addition, when projections 40 and 44 are separated, through the annular space 54. The cavities 84 and 90 communicate with each other by means of a valve seat 94 cooperating with a face of the diaphragm 58. The annular cavity 84 communicates with the system reservoir 16 through a passageway 96 and the fluid line 22. A filter 98 is disposed in the housing adjacent the passageway 96. The annular cavity 90 communicates with the system unloader 14 through a passageway 100 and the fluid line 24. Pipe plugs 102 are for closure of alternate piping arrangements.

The operation of the governor will be defined in a sequence of events commencing with 0 psi in the system, and pumping. During the pumping mode the unloader 14, fluid line 24, and cavity 90 are open to atmosphere, while during the unloaded mode all are subjected to system pressure.

Figure 2:
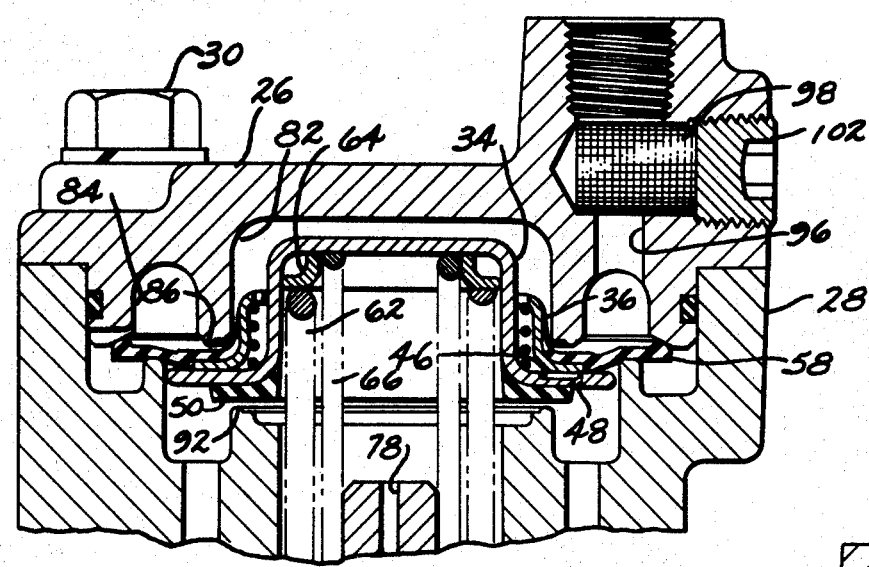
FIG. 2 is a cross section of the governor of FIG. 1 at the instant it is making the transition from the pumping mode to the unloaded mode.

Referring to FIG. 1, the cavity 90 and the unloader 14 are open to atmosphere over the valve seat 92 and through the orifice 78. The system pressure reacts upon the annular area defined by valve seats 94 and 86. When the pressure increases to the point where the force upon this effective area equals or slightly exceeds the force exerted in the opposing direction by the springs 62 and 66, the valve defined by the diaphragm 58 and valve seat 86 opens. The system air pressure at once reacts over the substantially larger area enclosed by the single valve seat 94. FIG. 2 shows the position of the governor components immediately following the opening of valve seat 86. The system pressure now acting upon the much larger area causes a rapid downward movement of elements 34 and 36. The leakage attributed to channels 46 and orifices 48 is of such proportion as to not materially impair the desired response.

Figure 3:
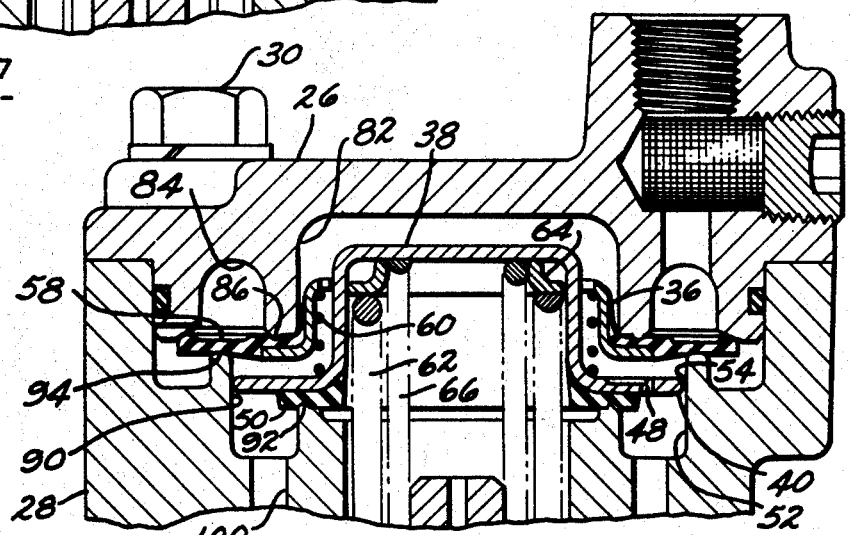
FIG. 3 is a cross section of the governor of FIG. 1 in the unloaded mode.

FIG. 3 shows the position of the governor components at the completion of the transition from the pumping to the unloaded mode. Valve element 50 is now closed against valve seat 92 and the area enclosed thereby is somewhat larger than the annular area defined by the seats 86 and 94 so that the system air pressure can readily hold the springs 62 and 66 in the now slightly further compressed position. In practice, the specific area enclosed by valve seat 92 as shown in FIG. 3 is determined by considering the range desired, the combined rates of springs 62 and 66, and the axial travel of the elements 34 and 36 from the closed position at valve seat 86 to the closed position at the valve seat 92. Immediately after closure of the valve seat 92, the air pressures in cavities 82, 84, and 90 become equalized, and with no air pressure opposing the action, the relatively light spring 60 returns the element 36 to the position of closing the diaphragm 58 against the valve seat 86. The clearance 54 between projection 40 and the bore 52 is now open to establish a much less restricted communication between cavities 82 and 90.

During the unloaded mode it is necessary to maintain the pressure in cavities 84 and 90 substantially equal, since subsequent governor action must be in response to system pressure which by direct connection is always that of cavity 84. There are two conditions that can occur. Normally, pressure in cavity 84 decreases and, when this occurs, differential pressure in cavity 90 will slightly flex the diaphragm 58 off the valve seat 94, thereby maintaining virtually equal pressures in the two cavities. Less frequently, but no less importantly, the pressure in cavity 90 may tend to become lower than that in cavity 84. Should this occur, the differential pressure in cavity 84 acting over the annular area between valve seats 86 and 94 will slightly compress spring 60, causing the valve at seat 86 to open slightly again, maintaining nearly equal pressure in the two cavities.

When the pressure in cavities 82 and 90 reacting over the area enclosed by valve seat 92 decreases to the point where it exerts a force equal to or slightly less than that of the springs 62 and 66, the valve at seat 92 will open and the air escaping therethrough will momentarily impinge upon the element 34, assisting springs 62 and 66 in producing a rapid upward movement. This momentary air assist is controlled largely by the restriction of orifice 78.

Figure 4:
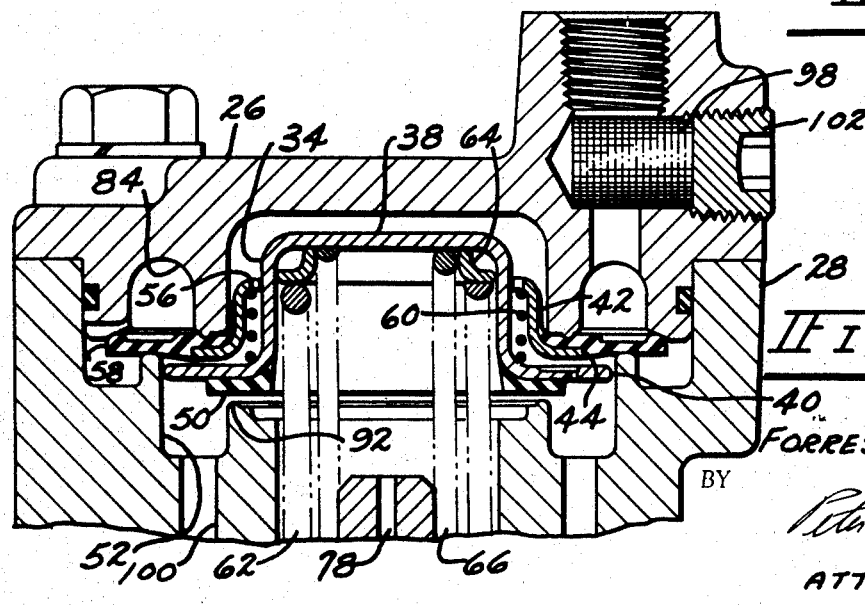
FIG. 4 is a cross section of the governor of FIG. 1 at the instant it is making the transition from the unloaded mode to the pumping mode.

FIG. 4 shows the position of the governor components approximately midway in the transition going from the unloaded mode to the pumping mode. As the first element 34 moves away from valve seat 92, there is a tendency for the air in cavity 82 to be momentarily compressed, thereby retarding the movement which ideally should be minimized. It is for this reason that the restriction of channels 46 and orifices 48 has been augmented by the clearance about projection 40 in the bore 52 to allow for escapement of this air into the cavity 90 and thence to atmosphere.

Immediately following the event shown in FIG. 4, the governor components return to the pumping mode, as shown in FIG. 1.

Automotive air compressor governors are required to maintain a pressure range of relatively small proportion as compared to the average total pressure within the system. Any friction encountered within the governor during its operation can adversely affect its range. In this invention, friction has been held to a minimum by employing a single flexible diaphragm 58 as opposed to the one or more sliding seal means found in much of the prior art.

A rapid and positive response in both directions is a desirable characteristic of compressor governors. This is frequently referred to as "snap action." While it is readily accomplished in one direction by restrictive orifice means, this same restriction will have an opposing effect on the alternate direction usually requiring some sort of compromise. In the apparatus of this invention, an orifice 48 is provided for one direction and is sized accordingly. For the alternate direction, its influence is substantially removed from the function, thereby enabling snap action in both directions to be achieved. The unwanted but ever present contaminants in automotive air systems often cause orifices in associated devices to become clogged or partially clogged. The unique operating sequence of the elements in this invention provides for a blast of air under pressure to literally wash the orifice 48 during one direction of each cycle, thereby greatly reducing the tendency for that orifice to become clogged. The contamination problem can also result in malfunction of small and delicate valves. In this invention all valve elements are comparatively large and rugged, offering adequate protection against failure attributable to dirt in the operating media.

I claim:

1. A pressure control governor comprising: a housing having a central cavity, first and second annular cavities confluent with said central cavity; means for providing communication between said second annular cavity and a fluid line; a valve means disposed in a first position within said housing segregating said central cavity into a first portion and a second portion, isolating said first annular cavity from said first portion, and isolating said first annular cavity from said second annular cavity; means for providing communication between said second portion and the atmosphere; an orifice located within said valve means providing restricted communication between said first portion and said second annular cavity; pressure means confluent with said first portion for moving said valve means into a second position to provide communication between said first annular cavity and said first portion, isolation of said second annular cavity from said second portion, and unrestricted communication between said first portion and said second annular cavity; and biasing means disposed in said second portion tending to urge said valve means into said first position.

2. A governor of the type to control pressure in a combination compressor, reservoir, and unloader, comprising: a housing having a central cavity, an annular cavity confluent with said central cavity, and an opening providing communication between said central cavity and the atmosphere; means providing communication between said annular cavity and the reservoir; means providing communication between said annular cavity and the unloader, a first annular valve seat extending into said annular cavity from said housing, a second annular valve seat coaxial with said first valve seat and extending from said housing into said annular cavity in a direction opposite from said first valve seat, a first tubular member having a radially extending first projection, said tubular member being disposed within said central cavity to dissect the same into first and second portions, said first portion being confluent with said opening, said first projection extending intermediate said first and second valve seats, a third valve seat disposed within said first portion and extending from said housing toward said first projection, a flexible annular member disposed intermediate said third valve seat and said projection of said first tubular member, a second tubular member disposed within said second portion and having a central opening which receives said first tubular member therein, said second tubular member having an inwardly directed first projection and a second projection extending radially outwardly from said second tubular member into said annular cavity, said second projection of said second tubular member extending intermediate said first valve seat and said third valve seat and intermediate said first tubular member projection and said first valve seat, a diaphragm member extending into the space between said first and second valve seats to engage the ends thereof and intermediate said first valve seat and said second projection of said second tubular member, first biasing means disposed between said first projection of said second tubular member and said first projection of said first tubular member biasing these two tubular members away from one another, support means located within said first portion, and second biasing means received within said first tubular member and supported by said support means, said second biasing means tending to urge said first tubular member away from said third valve seat, thereby tending to urge said second projection of said second tubular member into abutting engagement with said diaphragm, which in turn is urged into abutting engagement with said first valve seat, and said diaphragm being operative to engage said second valve seat by pressure being supplied to its surface through said opening providing communication between said reservoir and said annular cavity.

3. The governor of claim 2 wherein the projection of said first tubular member has a radially extending channel therein.

4. The governor of claim 2 wherein said second biasing means comprises a first spring having a constant load and a second spring having means for varying its load.

5. The governor of claim 4 wherein one of said springs is coaxially received within the other.

6. A governor of the type to control pressure in a combination compressor, reservoir, and unloader, comprising: a housing having a cavity and an opening providing communication between said cavity and the atmosphere; means providing communication between said cavity and the reservoir; means providing communication between said cavity and the unloader, a first annular valve seat extending into said cavity from said housing, a second annular valve seat extending from said housing into said cavity in a direction opposite from said first valve seat, said second valve seat having a diameter smaller than said first valve seat, a first tubular member having an open end, a closed end, and a radially extending projection adjacent its open end, said tubular member being disposed within said cavity to define a first chamber that is confluent with said opening, a third annular valve seat disposed within said cavity and extending from said housing toward the open end of said tubular member, a flexible ring member disposed intermediate said third annular valve seat and said projection of said first tubular member, a second tubular member disposed within said cavity and having a central opening which receives said first tubular member therein, a second projection extending radially from said second tubular member intermediate said second valve seat and said first projection, an annular diaphragm member located between said second projection and said second valve seat and engagingly extending from the end of said first valve seat to the end of said second valve seat, said diaphragm and said first and second valve seats defining a second chamber confluent with said reservoir communication means, said first valve seat, said flexible ring member, said first tubular member projection and said third valve seat defining a third chamber which is confluent with said unloader communication means, first biasing means disposed between said second tubular member and said first projection biasing these two away from one another, and second biasing means received within said first tubular member and supported by support means, said second biasing means tending to urge said first tubular member away from said third seat, thereby tending to bias said second projection into abutting engagement with said diaphragm, which in turn is urged into abutting engagement with said second valve seat.

7. The governor of claim 6 wherein the radially extending projection of said first tubular member has a radially extending opening.

8. The governor of claim 6 wherein said second biasing means comprises a first spring having a constant load and a second spring having means for varying its load.

9. The governor of claim 8 wherein one of said springs is coaxially received within the other.

10. A governor of the type to control pressure in a combination compressor, reservoir, and unloader, comprising: a housing having a cavity and an opening providing communication between said cavity and the atmosphere; means providing communication between said cavity and the reservoir; means providing communication between said cavity and the unloader, a first annular valve seat extending into said cavity from said housing, a second annular valve seat extending from said housing into said cavity in a direction opposite from said first valve seat, said second valve seat having a smaller diameter than and being coaxial with said first valve seat, a first tubular member having a radially extending first projection, said first tubular member being disposed within said cavity to define a first interior chamber that is confluent with said opening and a second chamber external of said first tubular member and defined by said tubular member, said second valve seat, and said projection, a third annular valve seat disposed within said cavity and extending from said housing toward said tubular member, said projection extending intermediate said second valve seat and said third valve seat, a flexible ring member disposed intermediate said third valve seat and said projection, a second tubular member disposed within said second chamber and having a central opening which receives said first tubular member therein, a second projection extending radially from said second tubular member intermediate said second valve seat and said first projection, a diaphragm member engagingly extending from said first annular valve seat to said second valve seat and being intermediate said second valve seat and said second projection, said diaphragm and said first and second valve seats defining a third chamber, said reservoir communication means being confluent with said third chamber, said first annular valve seat, said diaphragm, said third valve seat, said ring member, and said first and second projections defining a fourth chamber, first biasing means disposed between said second tubular member and said first projection member biasing these two members away from one another, and second biasing means received within said first tubular member and supported by said housing, said second biasing means urging said first tubular member away from said third valve seat, thereby tending to bias said second projection into abutting engagement with said diaphragm, said diaphragm in turn being urged into abutting engagement with said second valve seat to seal said second chamber from said third chamber and to allow communication between said first chamber and said fourth chamber, said diaphragm being operative to yield to pressure in said third chamber to open the space between said diaphragm and said second valve seat, thereby rendering said second and third chambers confluent.

11. The governor of claim 10 wherein the radially extending projection of said first tubular member has a radially extending channel.

12. The governor of claim 10 wherein said second biasing means comprises a first spring having a constant load and a second spring having means for varying its load.

13. The governor of claim 12 wherein one of said springs is coaxially received within the other.

* * * * *